United States Patent [19]

Grunze et al.

[11] Patent Number: 5,582,483
[45] Date of Patent: Dec. 10, 1996

[54] ROLLER GUIDE MEMBER FOR FULL COMPLEMENT ROLLER BEARING

[75] Inventors: Mark R. Grunze, Naperville; Robert B. Warrick, St. Charles, both of Ill.

[73] Assignee: Rexnord Corporation, Milwaukee, Wis.

[21] Appl. No.: 391,538

[22] Filed: Feb. 21, 1995

Related U.S. Application Data

[62] Division of Ser. No. 162,448, Dec. 3, 1993, Pat. No. 5,413,416.

[51] Int. Cl.⁶ ............................ F16C 33/36; F16C 33/49
[52] U.S. Cl. ........................ 384/572; 384/574; 384/577
[58] Field of Search .................................. 384/551, 558, 384/571, 572–580, 450

[56] References Cited

U.S. PATENT DOCUMENTS

| | | | |
|---|---|---|---|
| 2,062,041 | 11/1936 | Robinson | 384/575 |
| 2,387,962 | 10/1945 | Williams. | |
| 2,767,037 | 10/1956 | Williams. | |
| 3,912,346 | 10/1975 | Boratynski et al.. | |
| 3,930,693 | 1/1976 | Bowen. | |
| 3,938,865 | 2/1976 | Rouverol. | |
| 3,963,285 | 6/1976 | Kellstrom | 384/450 |
| 4,120,542 | 10/1978 | Bhateja et al.. | |
| 4,138,170 | 2/1979 | Markfelder et al.. | |
| 4,492,415 | 1/1985 | Baile et al. | 384/463 |
| 4,557,613 | 12/1985 | Tallian et al. | 384/568 |
| 4,705,411 | 11/1987 | Kellstrom | 384/450 |
| 4,714,358 | 12/1987 | Bayer et al. | 384/571 X |
| 4,825,964 | 5/1989 | Rives | 384/572 X |
| 4,952,079 | 8/1990 | Lingner | 384/575 |
| 5,037,214 | 8/1991 | Dougherty | 384/571 |
| 5,074,680 | 12/1991 | Hoch et al. | 384/560 |

FOREIGN PATENT DOCUMENTS

| | | | |
|---|---|---|---|
| 60-188617 | 9/1985 | Japan. | |
| 1521949 | 11/1989 | U.S.S.R. | 384/551 |
| 747314 | 4/1956 | United Kingdom. | |

OTHER PUBLICATIONS

Rollway Product Bulletin, "Nutating Roller Bearings", 1983.
For Design News by David J. Bak, "Nutating Bearing Offsets Oscillating Motion", pp. 126–127, 1984.

*Primary Examiner*—Thomas R. Hannon
*Attorney, Agent, or Firm*—Michael, Best & Friedrich

[57] ABSTRACT

A roller bearing apparatus including inner and outer rings defining a pair of raceway spaces, a plurality of rollers arranged in oppositely axially inclined rows each occupying one of the raceway spaces, and a guide member. The guide member includes a ring between the roller rows and oppositely extending shortened prongs or stubs extending only a short distance between the rollers so as not to take up space that otherwise could be used for one or more additional rollers. The pocket bottoms are angled to skew the rollers to promote roller precession or indexing. Alternatively, the guide member can include a reduced number of larger prongs to replace one or more of the stubs.

6 Claims, 4 Drawing Sheets

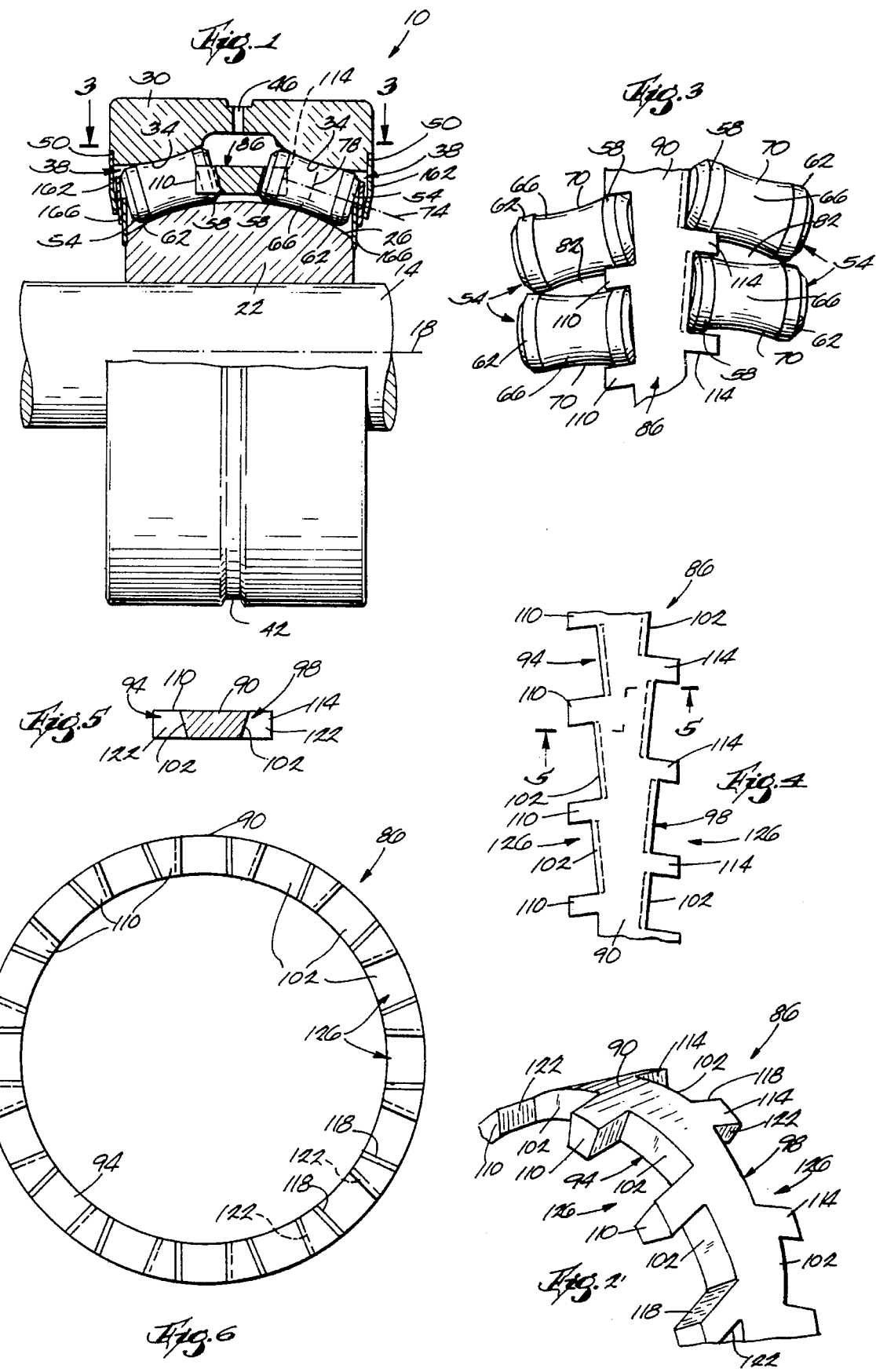

ROLLER GUIDE MEMBER FOR FULL COMPLEMENT ROLLER BEARING

This is a divisional of application Ser. No. 162,448 filed Dec. 3, 1993, now allowed U.S. Pat. No. 5,413,416.

BACKGROUND OF THE INVENTION

1. Field of the Invention

The invention relates generally to roller bearings, and more particularly to roller guides such as retainers and guide rings used in roller bearings to hold and position rolling elements.

2. Reference to Prior Art

Examples of self-aligning angular contact roller bearings are provided in U.S. Pat. No. 2,387,962 issued Sep. 28, 1942, U.S. Pat. No. 2,767,037 issued Oct. 16, 1956, and U.S. Pat. No. 4,557,613 issued Dec. 10, 1985. In each of those patents the illustrated roller bearing includes an inner ring that provides a substantially spherical inner race surface, an outer ring having a pair of outer race surfaces with convex curvatures, and a pair of oppositely axially inclined rows of symmetrical, hourglass-shaped rollers. Another example of an angular contact roller bearing is illustrated in U.S. Pat. No. 3,912,346 issued Oct. 14, 1975. That roller bearing includes oppositely axially inclined rows of symmetrical, barrel-shaped rollers.

The foregoing roller bearings also include roller cages or retainers to separate, guide and position the rollers in each row. Each of the retainers includes a set of axially extending webs or prongs that circumferentially separate the rollers in one of the rows and a set of oppositely axially extending prongs that circumferentially separate the rollers in the other row. A disadvantage associated with known roller retainers such as those used in the aforementioned patents is that they fully separate the rollers and occupy space within the bearing unit and between the rollers that could otherwise be used for additional rollers and/or additional lubricant.

Additionally, loads exerted on a bearing unit such as one of those described above are typically carried by the rollers in only one part of the unit at a time, that part being referred to as the "load zone". Especially where bearings are used in oscillatory applications, it is desired that the rollers in the bearing unit precess or index so that they are cycled through the load zone. Cycling the rollers results in utilization of the entire race surface of each of the rollers to extend rolling contact fatigue life. Cycling the rollers also redistributes lubrication within the bearing unit which in turn reduces fretting damage and improves the bearing unit's resistance to raceway corrosion. To cause such precessing or indexing of the rollers, it is known to use a retainer as described above but with prongs that define skewed roller pockets. In one known retainer design the prongs are inclined at an angle of about 4° to provide an imbalanced amount of skew to the rollers. When the angle of oscillation is sufficiently large (i.e., at least 2°–3°) the skewed rollers will precess or index during oscillation of the bearing unit.

While a retainer with inclined prongs has advantages for initiating roller precessing or indexing, that retainer also occupies space within the bearing unit and limits the number of rollers that will fit in the unit, thereby limiting the load capacity of the bearing unit.

SUMMARY OF THE INVENTION

The invention provides a roller bearing apparatus having an improved roller guide member that improves the operating characteristics of the bearing. The guide member is designed to achieve the benefits of prior art retainers and guide rings while improving the performance of the bearing by maximizing the number of rollers that can be used in the bearing up to a full complement (i.e., maximum number of rollers of a particular size that will fit in a particular bearing). By increasing the number of rollers relative to comparably sized prior art bearings including retainers, the load on the bearing will be distributed amongst a greater number of rollers occupying the load zone. This increases the load capacity of the bearing. The guide member is also designed to promote roller precessing or indexing so that the rollers are regularly cycled through the load zone.

More particularly, in one embodiment the invention provides a roller bearing including an inner ring member, an outer ring member, and at least one axially inclined annular row of symmetrical rollers between the inner and outer ring members. Since the annular row of rollers is axially inclined or tapered, the end portions or hubs of the rollers occupying the wide side of the row are circumferentially spaced apart relative to the end portions or hubs of the rollers occupying the narrow side of the row. The roller bearing also includes a roller guide member for guiding the rollers. The guide member includes a base web or ring having opposite radially extending side surfaces that are each provided with discrete circumferentially slanted surface portions or pocket bottoms against which the ends of the rollers occupying the wide side of the row seat. The slanted surface portions provide angular skew to the rollers to promote regular roller precessing or indexing during service of the roller bearing.

In addition to the slanted surface portions on the ring, the guide member includes prongs or stubs extending from the ring. The stubs are substantially shorter in length than the prongs in prior art retainers, and the stubs extend between the circumferentially spaced apart end portions of the rollers at the wide side of the row. The stubs preferably do not, however, extend far enough between the rollers to separate the roller end portions at the narrow side of the row. Therefore the number of rollers that will fit in the roller bearing is maximized and the roller bearing can include up to a full complement of rollers if desired.

The stubs, when combined with the slanted pocket bottoms, promote precessing or indexing of the rollers in the roller bearing. In particular, the stubs assist in maintaining the ends of the rollers in their seated positions against the pocket bottoms. The stubs can be angled relative to the ring to skew the roller receiving pockets defined between the stubs. Applicants have observed that the precessing or indexing which takes place is approximately as effective as that accomplished when prior art retainers including prongs extending substantially the entire length of the rollers are used.

In another embodiment of the invention, the roller bearing includes a retainer which has fewer prongs than prior art retainers and which therefore has space for additional rollers. As with the stubs discussed above, the prongs are preferably inclined with respect to the retainer ring to impart a desired amount of skew to the rollers to promote roller precession, and the retainer ring can, if desired, include circumferentially slanted side surface portions to further enhance roller skewing characteristics. The prongs of the retainer can extend either between the rollers in a row or into bores provided in selected rollers in the row. When the prongs are positioned within the rollers the roller bearing can accommodate a full complement of rollers.

Various other features and advantages of the invention will become apparent to those skilled in the art upon review of the following detailed description, claims and drawings.

BRIEF DESCRIPTION OF THE DRAWINGS

FIG. 1 is a side elevational view, partially broken away and in section, of a roller bearing apparatus embodying the invention and shown supporting a shaft.

FIG. 2 is an enlarged perspective view of a portion of the guide member illustrated in FIG. 1.

FIG. 3 is an enlarged top plan view taken along line 3—3 in FIG. 1 and showing portions of the guide member and the rows of rollers.

FIG. 4 is a view of the guide member portion similar to FIG. 3 but with the guide member portion shown flattened for clarity.

FIG. 5 is a view taken along line 5—5 in FIG. 4.

FIG. 6 is an enlarged elevational view of the guide member illustrated in FIG. 1.

Figure 7:
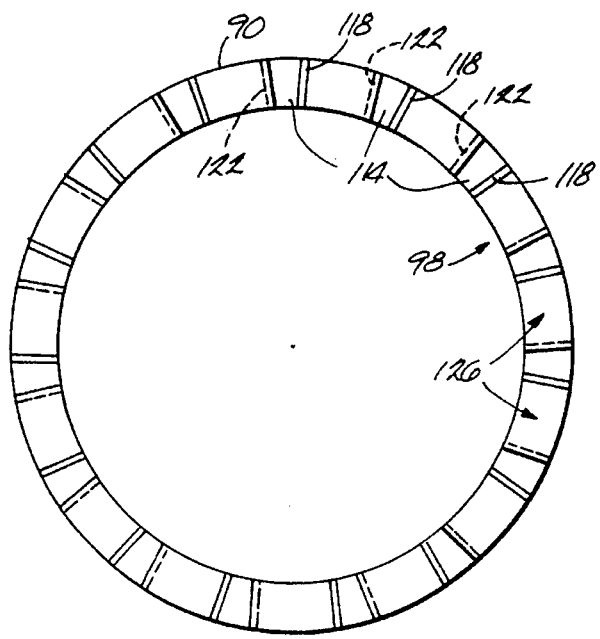
FIG. 7 is an enlarged elevational view of a modified version of the guide member illustrated in FIGS. 1–6.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF PREFERRED EMBODIMENTS

Illustrated in FIG. 1 is a roller bearing apparatus 10 which is shown supporting a rotating or oscillating shaft 14. In the particular embodiment illustrated in the drawings, the bearing apparatus 10 is an angular contact internally self-aligning bearing having an axis 18.

As shown in FIG. 1, the roller bearing apparatus 10 includes an annular inner race or ring member 22 through which the shaft 14 extends. The inner ring member 22 includes an arcuate outer surface forming an inner bearing race surface 26 which in the illustrated arrangement is substantially spheroidal. The roller bearing apparatus 10 also includes an annular outer race or ring member 30 encircling the inner ring member 22. The outer ring member 30 includes a pair of axially oppositely inclined, arcuate outer bearing race surfaces 34 each opposing the inner race surface 26 to provide a pair of raceway spaces 38. The outer race surfaces 34 are of generally convex curvature as seen in FIG. 1.

To facilitate periodic lubrication of the bearing apparatus 10, an annular groove 42 is provided on the outer circumferential side of the outer ring member 30 and a hole 46 communicates between the groove 42 and the interior of the roller bearing apparatus 10. A desired lubricant can be injected into the groove 42 by suitable means such as a grease gun (not shown), as is described in aforementioned U.S. Pat. No. 2,767,037. For reasons explained hereinafter, the outer ring member 30 also includes notches 50 in its opposite sides.

The roller bearing apparatus 10 also includes a plurality of rollers 54. While the rollers 54 can have other configurations such as a barrel-shaped configuration for example, in the illustrated arrangement each of the rollers 54 is generally hourglass-shaped. More particularly, each of the rollers 54 includes opposite inboard and outboard end portions or hubs 58 and 62 that are substantially cylindrical and a midsection 66 with an arcuate outer surface 70 having a concave longitudinal profile. Each of the rollers 54 also has (FIG. 1) a longitudinal axis 74 and is symmetric about a plane which is perpendicular to the axis 74 and which includes a line 78 through the midpoint of the roller 34.

The rollers 54 are arranged in the raceway spaces 38 in annular rows. As shown in FIG. 1, the annular rows are oppositely axially inclined such that each row tapers in an axially outward direction. As a result (see FIG. 3), the inboard hubs 58 of the rollers 54 on the larger diameter side of each row are more circumferentially spaced apart (i.e., define spaces 82 therebetween) than are the outboard hubs 62 on the smaller diameter side of the row. As shown in FIG. 3, substantially no space exists between the rollers 54 at the small diameter side of the row and each outboard hub 62 normally contacts adjacent rollers 54 during normal operation of the roller bearing apparatus 10.

While the number of rollers 54 in each row can vary, each row preferably includes a full complement of rollers (i.e., sixteen rollers 54 in the particular embodiment shown in FIG. 1). By maximizing the number of rollers 54 in each row full use is made of the available raceway space.

The roller bearing apparatus 10 also includes a guide member 86 positioned between the annular rows of rollers 54. As shown in FIGS. 2–6, the guide member 86 includes a base web or ring 90 having opposite radially extending sides 94 and 98. The radial sides 94 and 98 taper radially inwardly (see FIG. 5) at an angle about equal to the angle of taper of the annular rows of rollers 54 (i.e., about 18.5° in the illustrated arrangement). Each of the radial sides 94 and 98 includes separate surface portions 102. In addition to being tapered radially inwardly, the surface portions 102 are sloped or slanted (FIG. 4) in a circumferential direction (i.e., sawtooth configuration) for reasons more fully explained below.

To promote precessing or indexing of the rollers 54 when the roller bearing apparatus 10 is in use, the guide member 86 is provided with means for skewing the rollers 54 (i.e., pivoting the rollers 34 about their respective midpoint lines 78) in one or both of the annular rows. In the illustrated arrangement the means for skewing the rollers 54 includes the slanted surface portions 102, a first set of prongs or stubs 110 extending in one axial direction (i.e., to the left in FIG. 1) from the ring 90, and a circumferentially offset second set of prongs or stubs 114 extending in the opposite axial direction (i.e., to the right in FIG. 1) from the ring 90. The stubs 110 and 114 separate the slanted surface portions 102 on the opposite sides 94 and 98 of the ring 90, and each of the stubs 110 and 114 includes (FIG. 6) opposite sides 118 and 122 that taper radially inwardly. In the embodiment illustrated in FIGS. 1–6, the stubs 110 and 114, like the slanted surface portions 102, are circumferentially angled or slanted relative to the ring 90. In particular, the surface portions 102 are slanted in the same direction and by about the same amount as the stubs 110 and 114. In the illustrated arrangement that amount is about 4.5°.

The stubs 110 and 114 define therebetween (FIGS. 2, 4 and 6) pockets 126 which are likewise slanted or skewed about 4.5°. The rollers 54 are received in the skewed pockets 126 and seated against the slanted surface portions 102 (i.e., pocket bottoms) so that the rollers 54 are also skewed about 4.5° and exhibit consistent, unidirectional precessing or indexing characteristics when employed in oscillatory applications. It is believed that, in the illustrated embodiment, the stubs 110 and 114 contribute indirectly to precessing or indexing by maintaining the roller ends in position against the slanted surface portions 102. By so doing it is also believed that the stubs 110 and 114 are effective in preventing the rollers 54 from "ramping up" on the guide member 86 which could conceivably lead to roller jamming.

While the guide member 86 is provided with both slanted surface portions 102 and stubs 110 and 114, in other embodiments guide members can be provided alternatively with slanted surface portions or stubs.

As shown in FIG. 3, the stubs 110 and 114 extend into the spaces 82 between the rollers 54 to provide substantially uniform circumferential spacing between inboard hubs 58. By separating the inboard hubs 58 running friction between the rollers 54 is reduced along with heat generation. The stubs 110 and 114 preferably do not, however, extend so far as to separate or interfere with interengagement between the outboard hubs 62. In particular, the stubs 110 and 114 are considerably shorter than the prongs in prior art arrangements and (see FIG. 1) are preferably only long enough to retain the rollers 54 within the pockets. In the illustrated embodiment, the length of the stubs 110 and 114 is substantially less than half the length of the rollers 54 and is about equal to the width dimension (i.e., axial length) of the inboard hubs 58.

In other arrangements, the length of the stubs 110 and 114 can vary depending upon the size of the spaces 82 between the rollers 54. For example, in the roller bearing apparatus 10 the number of rollers 54 constituting a full complement is determined in part by the circumference of the narrow side of each row of rollers. If the rows were to taper more sharply, the number of rollers constituting a full complement could decrease, in which case the spaces between the end portions 58 of the rollers 54 at the wide side of the row increase. In that case the length of the stubs 110 and 114 may be increased somewhat.

The guide member 86 can be made of any suitable material and in the illustrated embodiment is preferably made of bronze. In other embodiments the guide member 86 can be made of other metals or even plastics which are more easily formed than metals.

While guide member 86 is designed for use with a full complement of skewed rollers 54, it can be modified in various ways to accommodate any desirable number of rollers, some of which need not be skewed, to reduce manufacturing time and costs, to decrease friction in the bearing, or to otherwise improve bearing performance. For example, FIG. 7 illustrates a guide member 130 which is similar to guide member 86, but which has been modified for use with opposite annular rows each including less than a full complement of rollers. In particular, in guide member 130 there are only fifteen of each of the stubs 110 and 114 to accommodate only fifteen rollers 34 (instead of a full complement of sixteen). The stubs 110 and 114 in guide member 130 are slightly more circumferentially spaced apart than in guide member 86 so that there is more available space between the rollers 54. That extra space can be used for additional lubricant, if desired.

Figure 8:
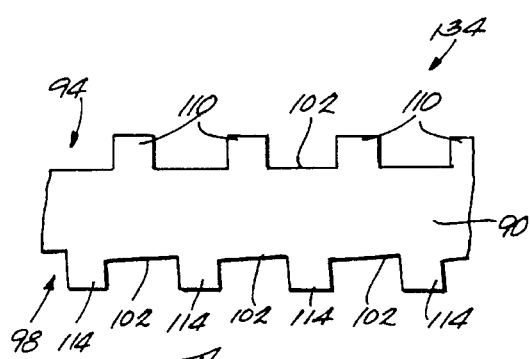
FIG. 8 is a top plan view, shown flattened for clarity, of a portion of a second modified version of the guide member illustrated in FIGS. 1–6.

Illustrated in FIG. 8 is a guide member 134 which is similar to guide member 86 (FIG. 4) but which has been modified for easier, more inexpensive manufacture. In particular, the stubs 110 and the surface portions 102 on side 94 of guide member 134 are not circumferentially angled with respect to the ring 90. When guide member 134 is used in a roller bearing it is expected that the rollers 54 received between the straight stubs will follow precession of the rollers 54 between the slanted stubs 114 despite not being normally skewed by guide member 134.

Figure 19:
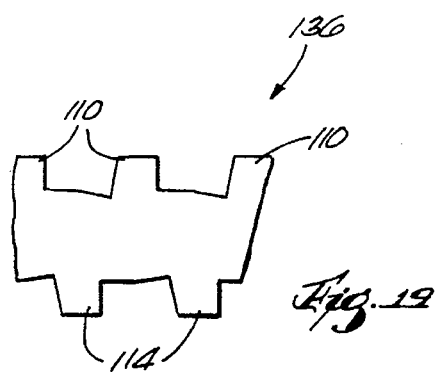
FIG. 19 is a top pan view, similar to FIG. 8, of a portion of a guide member having stubs configured for castability.

Illustrated in FIG. 19 is a guide member 136 similar to guide member 134 (FIG. 8) but which has been modified to be castable so that no machining is required to finish the part. In particular, the stubs 110 and 114 are configured to provide a "half-chevron" pocket design which can be cast into the guide member 136. Since the guide member 136 includes no undercut portions, such as are produced when the stubs 110 and/or 114 are angled, die halves (not shown) used in the casting operation can be easily separated and the guide member 136 easily removed from the die.

Figure 9:
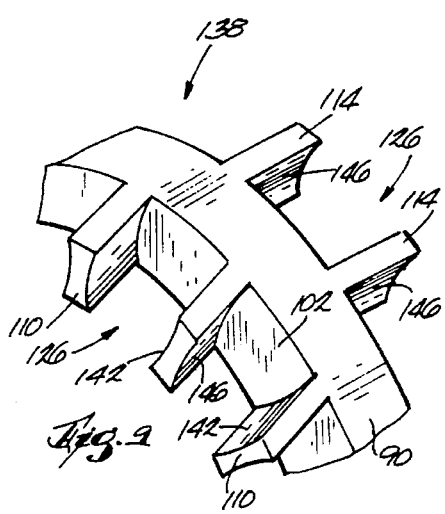
FIG. 9 is a perspective view of a portion of a third modified version of the guide member illustrated in FIGS. 1–6.

Illustrated in FIG. 9 is a guide member 138 in accordance with a third modified version of guide member 86. In guide member 138, the stubs 110 and 114 have concave sides 142 and 146 instead of the planar sides 118 and 122 of guide member 86 to provide more well-defined pockets 126.

Figure 10:
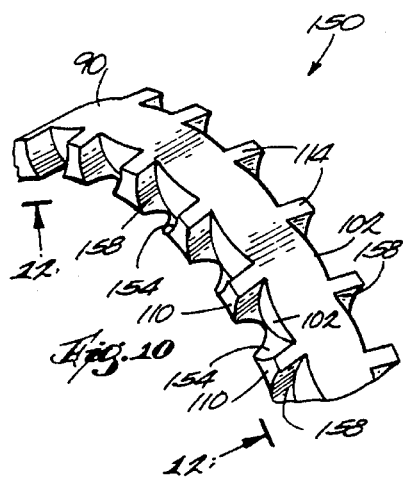
FIG. 10 is a perspective view of a portion of a fourth modified version of the guide member illustrated in FIGS. 1–6.
Figure 11:
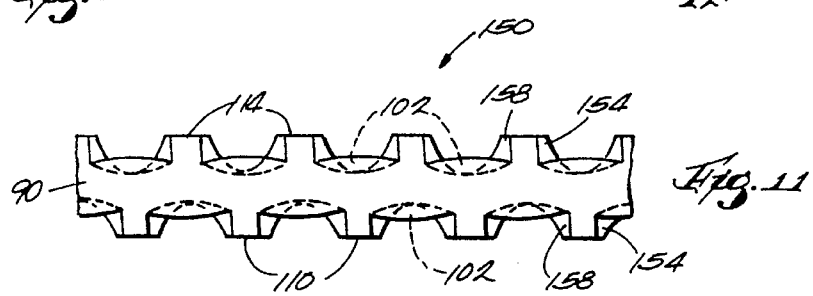
FIG. 11 is a top plan view of the guide member illustrated in FIG. 10 and shown flattened for clarity.
Figure 12:
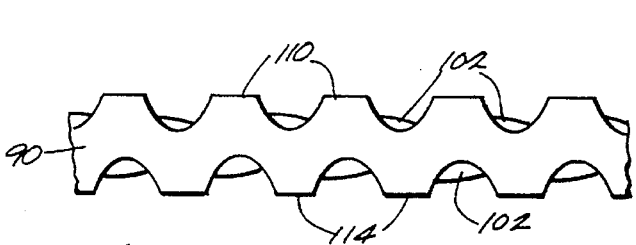
FIG. 12 is a view taken along line 12—12 in FIG. 10 and shown flattened clarity.

Illustrated in FIG. 10 is a guide member 150 in accordance with a fourth modified version of the guide member 86. The stubs 110 and 114 of guide member 150 have concave sides 154 and 158 that are extended relative to the concave sides 142 and 46 of guide member 138 (FIG. 7).

The roller bearing apparatus 10 also includes means for containing lubricant and for preventing contaminants from entering the raceway spaces 38. In the illustrated arrangement such means includes annular shield members 162 each seated in one of the notches 50 and annular seals 166 each mounted on one of the shield members 162.

Figure 13:
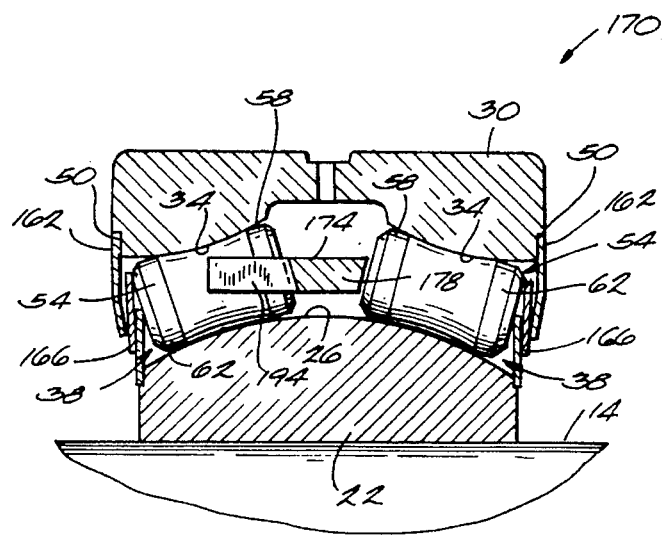
FIG. 13 is a half-sectional view of a roller bearing apparatus in accordance with a second embodiment of the invention.

Illustrated in FIG. 13 is a roller bearing apparatus 170 in accordance with an alternative embodiment of the invention. Roller bearing apparatus 170 is similar to roller bearing apparatus 10 (FIG. 1) except that guide member 86 (FIG. 1) is replaced with a retainer 174 (FIG. 13), and roller bearing apparatus 170 has a larger diameter (such that a full complement of rollers is in excess of sixteen). Hence, the same reference numerals are used for elements common to both bearing apparatus.

Figure 14:
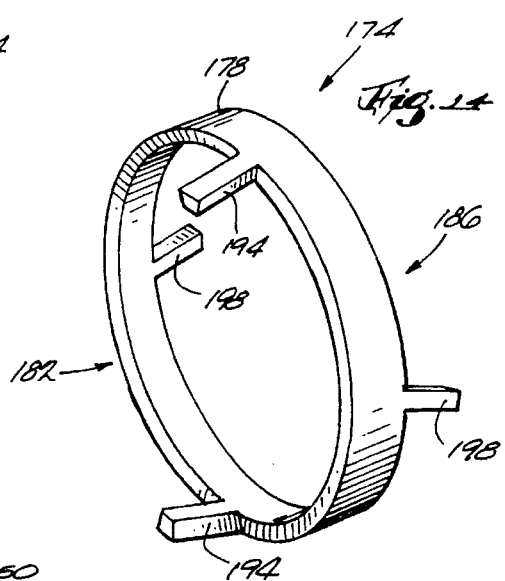
FIG. 14 is a perspective view of the retainer illustrated in FIG. 13.

As shown in FIG. 14, the retainer 174 includes a ring 178 having sides 182 and 186 that taper radially inwardly. The retainer 174 also includes prongs that may number as few as one, but that in the illustrated embodiment include a first pair of prongs 194 extending in one axial direction from the ring 178 and a second pair of prongs 198 extending in the opposite axial direction from the ring 178. The prongs 194 and 198 are circumferentially angled (at about 4° in the illustrated embodiment) with respect to the ring 178 to impart skew to the rollers 54. The prongs 198 are offset 90° with respect to the prongs 194 so that precessing or indexing of the rollers 54 is substantially consistent regardless of the particular angular position of the retainer 174 in the roller bearing apparatus 170.

Figure 15:
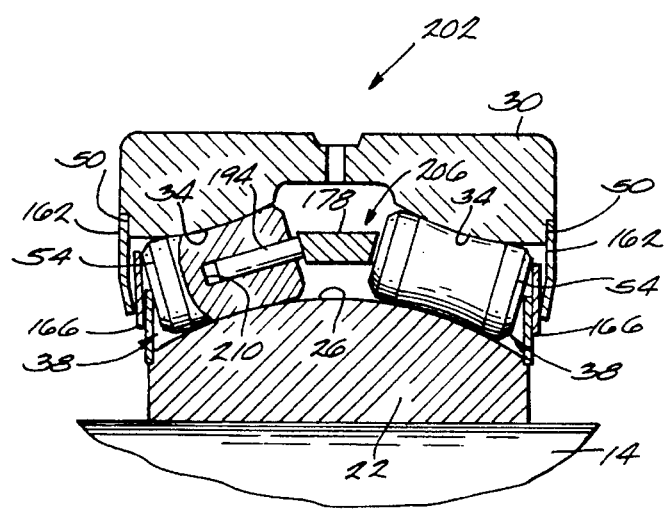
FIG. 15 is a half-sectional view of a roller bearing including a modified version of the retainer illustrated in FIGS. 13 and 14.
Figure 16:
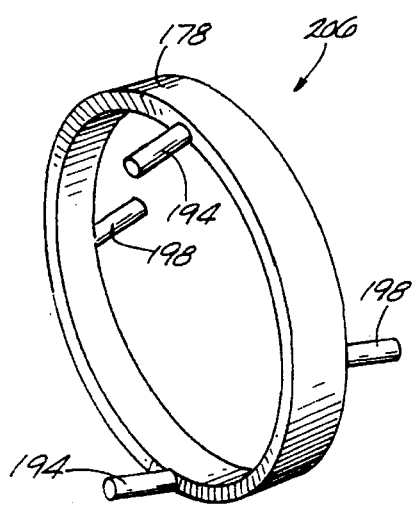
FIG. 16 is a perspective view of the retainer illustrated in FIG. 15.

Illustrated in FIG. 15 is a roller bearing apparatus 202 including a retainer 206 which is a modified version of the retainer 174 shown in FIGS. 13 and 14. As shown in FIG. 16, the prongs 194 and 198 are angled radially inwardly at about the angle of taper of the rollers 54. The prongs 194 and 198 have circular cross-sections and fit (FIG. 15) within cylindrical bores 210 provided in selected ones of the rollers 54. By inserting the prongs 194 and 198 into the rollers 54, the retainer 206 does not restrict the number of rollers that can be used in the bearing apparatus 202. Thus, a full complement of rollers 54 can be used if desired.

Figure 17:
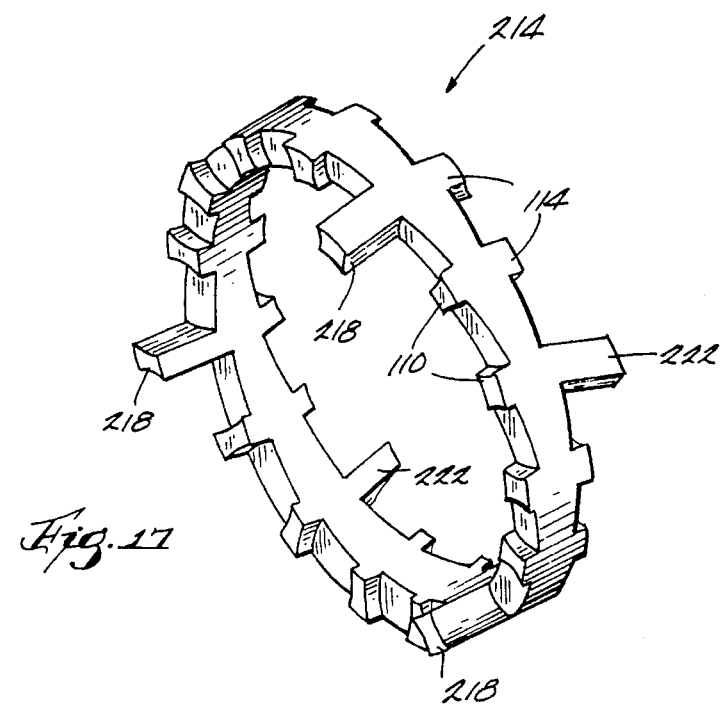
FIG. 17 is a perspective view of a portion of a modified version of the retainer illustrated in FIGS. 13 and 14.

Illustrated in FIG. 17 is a retainer 214 that is a hybrid of guide member 138 (FIG. 7) and retainer 174 (FIG. 14). In particular, the stubs 110 and 114 are not circumferentially offset and three of the stubs 110 and 114 on each side of the retainer 214 have been lengthened to provide prongs 218 and 222. Retainer 214 is expected to provide improved roller precessing relative to retainer 174 while accommodating roller numbers approaching the full complement that can be used with guide member 138.

Figure 18:
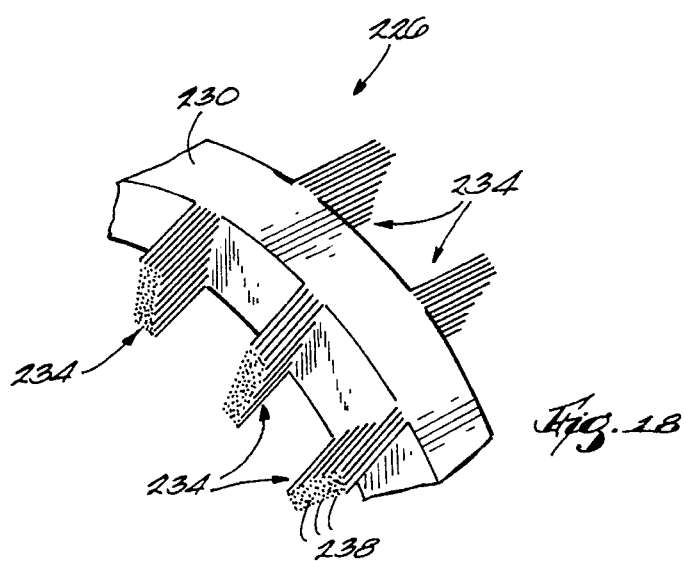
FIG. 18 is a perspective view of a portion of a retainer in accordance with a third embodiment of the invention.

Illustrated in FIG. 18 is a retainer 226 in accordance with a third embodiment of the invention. The retainer 226 is made of a plastic material and includes a ring 230 and flexible prongs 234. In the illustrated arrangement the prongs 234 are brush-like members each formed from a number of bristles 238. The bristles 238 permit the prongs 234 to easily deform when engaged by a roller to fill unused areas in the raceway spaces so that the number of rollers in a roller bearing including the retainer 226 is only minimally affected by the presence of the prongs 234. The prongs 234 are also preferably angled to encourage roller skew (and roller precessing or indexing). It is believed that the roller skew generated by the prongs 234 will be sufficient for adequate roller precessing or indexing.

Advantageously, the guide members 86, 130, 134, 138 and 150, the retainers 174, 206, 214 and 226, and variations of thereof can be used in various roller bearing units to maximize the space available for rollers. That available space can be filled with up to a full complement of rollers to improve the load rating of the bearing unit, and/or additional lubricant can be provided. Additionally, the guide members and retainers of the present invention are designed to help achieve substantially consistent, unidirectional precessing or indexing of the rollers 54. That feature, which encourages the rollers to cycle through the load zone, increases the life and durability of the bearing unit. The guide members 86, 130, 134, 138 and 150, the retainers 174, 206, 214 and 226 also ease assembly of the bearing unit.

Other features and advantages of the invention are set forth in the following claims.

We claim:

1. A roller bearing apparatus comprising an inner ring member, an outer ring member encircling the inner ring member, the inner and outer ring members defining therebetween a first raceway space, a plurality of rollers including rollers arranged in an axially inclined first annular row, the first annular row of rollers being positioned in the first raceway space, and a retainer including a ring, and means for skewing the rollers in the first annular row, the means for skewing the rollers including at least one prong extending from the ring in a first axial direction, the rollers in the first annular row outnumbering the prongs extending in the first axial direction.

2. A roller bearing apparatus a set forth in claim 1 wherein each of the prongs extending in the first axial direction extends between a pair of the rollers in the first annular row, wherein the inner and outer ring members define therebetween a second raceway space spaced axially from the first raceway space, wherein the plurality of rollers includes rollers arranged in an axially inclined second annular row, the second annular row of rollers being positioned in the second raceway space, and wherein the retainer includes at least one prong extending from the ring in a second axial direction opposite the first axial direction, each of the prongs extending in the second axial direction extending between a pair of the rollers in the second annular row, the rollers in the second annular row outnumbering the prongs extending in the second axial direction.

3. A roller bearing apparatus as set forth in claim 2 wherein the prongs extending in the first axial direction are circumferentially offset with respect to the prongs extending in the second axial direction.

4. A roller bearing apparatus as set forth in claim 3 wherein each of the prongs is circumferentially angled with respect to the ring.

5. A roller bearing apparatus as set forth in claim 2 wherein there are two prongs extending in the first axial direction and two prongs extending in the second axial direction, wherein the prongs extending in the first axial direction are 180 degrees apart, and the prongs extending in the second axial direction are 180 degrees apart, and wherein the prongs extending in the first axial direction are 90 degrees out of phase with the prongs extending in the second axial direction.

6. A roller bearing apparatus as set forth in claim 1 wherein at least one of the rollers in the first annular row includes a central bore, and wherein each of the prongs extending in the first axial direction is received in the central bore of one of said rollers, and wherein the first annular row of rollers includes a full complement of rollers.

* * * * *